No. 754,884. PATENTED MAR. 15, 1904.
J. McFARLANE.
CABLE CLIP.
APPLICATION FILED JUNE 3, 1903.
NO MODEL.

Witness:
F. W. H. Clay
Chas. H. Ebert

Inventor,
James McFarlane
By Paul Synnestvedt
Att'y.

No. 754,884. Patented March 15, 1904.

UNITED STATES PATENT OFFICE.

JAMES McFARLANE, OF ALLEGHENY, PENNSYLVANIA.

CABLE-CLIP.

SPECIFICATION forming part of Letters Patent No. 754,884, dated March 15, 1904.

Application filed June 3, 1903. Serial No. 159,974. (No model.)

*To all whom it may concern:*

Be it known that I, JAMES McFARLANE, a citizen of the United States, residing at Allegheny, county of Allegheny, and State of Pennsylvania, have invented a certain new and useful Cable-Clip, of which the following is a specification.

My invention relates to means for suspending electric conductor cables and such like articles from aerial wires, and its object is to provide a cheap, convenient and strong clip for the purpose of surrounding the cable and readily attaching to the messenger or suspension wire; to provide means by which the clip may have a large amount of rigidity both in the body and in the hook portion and being at the same time semi-automatically fitted to its place; to provide a clip which will closely hug the cable and be locked in position when employed, and to generally improve the structure and mode of application of cable clips.

The above objects, and other advantages which will hereinafter appear, I attain by means of the construction illustrated in preferred forms in the accompanying drawing, wherein,—

It is primarily important that the clip be capable of being easily put in place, and that it be of a form to economize the metal of which it is made, as well as to possess the greatest possible strength. It is also highly desirable that the clip when in place shall hug the cable closely and will not slide on the cable and wear the same or move from its position.

Figure 1:
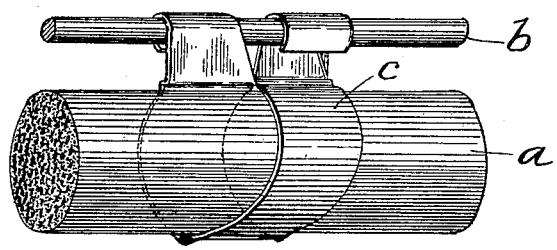
Figure 1 is a perspective view of a portion of a conductor cable and a messenger wire with my preferred form of clip joining the two.
Figure 2:
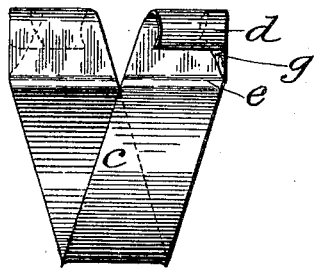
Figure 2 is a side elevation of the clip alone.
Figure 3:
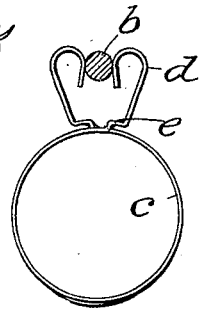
Figure 3 represents the same in the act of being placed upon the messenger wire.
Figure 4:
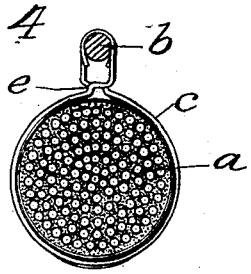
Figure 4 is a cross sectional view of the cable and messenger wire with the clip in place.

I therefore in my preferred form, make the clip $c$ of some kind of resilient metal such as sheet steel, and the body portion $c$ is bent around to fit the cable in such fashion that the axis of curvature is at an angle to the plane of the edges of the clip, that is, it is skewed along the bend, as will be plain from Figure 2. The body portion terminates on each side in hooks $d$ which are formed to cross over and loop upon the messenger wire $b$ opposite to their respective supporting sides of the clip, as will be evident from Figure 3. In order to provide for hugging the cable closely the curved portion $c$ is provided at the tops with off-sets $e$ in order to give greater range of flexibility to the shank portion holding the hook without the necessity of drawing up the body portion $c$. In Figure 3 the clip is shown in the act of going over the messenger wire $b$, and it will be seen that to take in the wire $b$ the hooks $d$ may spring outward by reason of the off-sets $e$ without taking up any of the circumference of the body portion $c$, so that when the supporting wire is in place as shown in Figure 4 the clip will have a snug fit upon the cable $a$. In order to avoid cutting off any of the metal, and also to give additional rigidity to the hooks $d$, it will be observed from Figure 2 that the corners of the metal are turned under as indicated at $g$.

Figure 5:
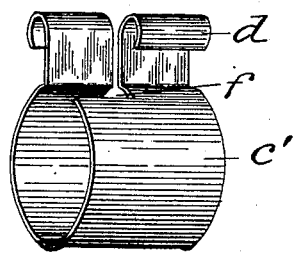
Figure 5 represents a modification of the device.
Figure 7:
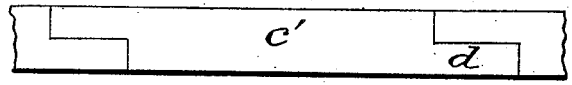
Figure 7 represents a convenient mode of cutting out the blanks for the form of clip in Figure 5.

Figure 5 shows a modified form in which the ends of the clip are cut out about half of the width and the hook portions $d$ are made on the half portion, and they thus fit together through the open spaces $f$ left by the form of cutting, as illustrated in Figure 7.

Figure 6:
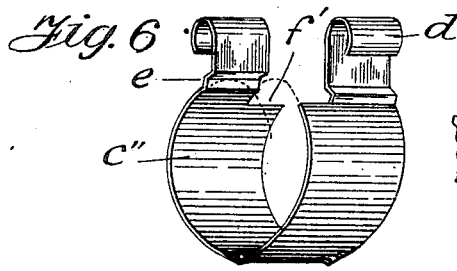
Figure 6 represents another modification of the device which contains features of the devices of both Figures 2 and 5.

Figure 6 illustrates a form of clip which embodies both the skew form of Figure 2 and also the sidewise off-set of the hook lugs $d$, leaving a cut out space $f'$ to accommodate the shank of the hook, and at the same time employing the skew form of the body. I prefer the form of Figure 2 however, because it employs the entire width of the metal for both the hook and the body portion and also because this peculiar form will prevent the clip from slipping sidewise on the cable. It is also preferable to make a slight downturned lip to the bottom portion of the clip as will be seen from Figures 2 and 5, in order to prevent cutting the covering of the cable.

From the above description it will be seen that the cable clip may be slipped over the cable and fitted snugly and at the same time by reason of the shoulders *e* there is allowed sufficient room to bend back the head carrying the hooks, *d*, to slip over the messenger wire *b* after which the elasticity of the clip, itself will insure the hooks *d* remaining firmly on the messenger wire and the natural tendency of the clip to open will cause the clip to turn sidewise and therefore give it a firm and constantly exerted grip upon the cable. At the same time by use of the entire width of the metal through the whole length of the cable clip we attain great economy of material and also rigidity, giving it a stiffness at the point immediately below the hooks which is the place where it is chiefly required. It is evident that the use of the device is not confined to cables but may also be used upon pipes, after the manner which is customary with such devices.

Having thus described my invention and illustrated its use, what I claim, and desire to secure by Letters Patent, is the following:

1. An integral open cable clip having crossed ends inturned to form hooks which face each other, and the body portion of the clip being bent askew, so that said hooks may engage a supporting wire side by side.

2. An open cable clip having the body portion bent into a helical circumference so that the hooks of the clip may be practically the same width as the body of the clip and may engage a suspension wire side by side, substantially as described.

3. A cable clip consisting of a band of metal bent into an open circumference and the extended ends thereof bent into hooks which face toward the center of the circumference, and the side of the clip being bent askew so that the hooks may lie side by side when in place.

4. An integral cable clip having a circumferential body portion, and two hooks crossing over and facing each other in position, and an off-set portion between the body and the hooks to give additional flexibility, substantially as described.

5. An open spring cable clip consisting of a circumferential body portion ending in crossed shanks having inturned hooks to face each other, whereby the clip may be placed upon the cable and afterward sprung over the messenger wire, substantially as described.

6. A cable clip consisting of a sheet metal band bent into circumferential form with its edges forming helices, and ending in hooks which both face outward, the outer edges of the metal being turned under to reinforce and stiffen the hook, substantially as described.

7. A clip consisting of a band portion ending in a double off-set bend and a hook at each end, the bend of the metal being about an axis oblique to the plane of the edges of the clip, whereby both hooks may rest side by side upon a supporting wire, substantially as described.

8. A suspension hook consisting of a flat band of sheet metal bent into circumferential form with the two sides set askew and ending in outwardly turned hooks, substantially as and for the purposes described.

In testimony whereof I have hereunder signed my name in the presence of the two subscribed witnesses.

JAMES McFARLANE.

Witnesses:
F. W. H. CLAY,
CHAS. H. EBERT.